United States Patent [19]

Marin

[11] Patent Number: 4,982,971
[45] Date of Patent: Jan. 8, 1991

[54] VEHICLE ENCLOSURE

[76] Inventor: Randy L. Marin, 413 Lady of the Lake Rd., St. Martinville, La. 70582

[21] Appl. No.: 518,079

[22] Filed: May 2, 1990

Related U.S. Application Data

[63] Continuation of Ser. No. 367,985, June. 19, 1989, abandoned.

[51] Int. Cl.⁵ .................................................. B60F 5/00
[52] U.S. Cl. ................................. 280/30; 280/415.1; 280/491.5; 52/66; 296/10; 296/181
[58] Field of Search .................. 280/7.1, 30, 414.1, 280/415.1, 418.1, 490.1, 491.5, 652, 656; 52/66, 143; 296/10, 158, 181, 182

[56] References Cited

U.S. PATENT DOCUMENTS

| | | | |
|---|---|---|---|
| 2,567,516 | 9/1951 | Jones | 52/66 X |
| 2,740,997 | 4/1956 | Gipslis | 52/66 |
| 3,945,159 | 3/1976 | Girnus, Sr. | 52/66 |
| 3,977,720 | 8/1976 | Schreiberg | 296/181 |
| 4,239,253 | 12/1980 | Golze | 296/181 X |
| 4,306,390 | 12/1981 | Brown | 52/67 |
| 4,480,851 | 11/1984 | St. Pierre | 280/656 |
| 4,579,382 | 4/1986 | Lake | 296/181 |
| 4,800,701 | 1/1989 | Dunsworth | 52/66 |
| 4,934,302 | 6/1990 | Harper | 280/414.1 X |

FOREIGN PATENT DOCUMENTS

| | | | |
|---|---|---|---|
| 846458 | 8/1952 | Fed. Rep. of Germany | 52/66 |
| 2946922 | 6/1981 | Fed. Rep. of Germany | 280/414.1 |
| 3513634 | 12/1985 | Fed. Rep. of Germany | 296/181 |
| 988383 | 4/1951 | France | 52/66 |
| 1152985 | 2/1958 | France | 52/66 |

*Primary Examiner*—Charles A. Marmor
*Assistant Examiner*—Brian L. Johnson
*Attorney, Agent, or Firm*—John D. Jeter

[57] ABSTRACT

A recreation vehicle enclosure includes a base to which a cover is pivotally secured at one end. The base is, preferably, rectangular in plan form and triangular in section to provide stiffness and to elevate a cover hinge to allow the cover to be fully opened in irregular terrain and to be gravity stabilized when open. Optional features include wheels and wheel mounts to convert the enclosure to an open road trailer and to convert the cover, when inverted, into an off-road trailer. The cover is shaped to accept nesting of covers for shipment and to reduce profile. An optional hitch provides means to attach to a towing vehicle. An optional solar panel, on the cover, charges the battery of a protected vehicle.

7 Claims, 1 Drawing Sheet

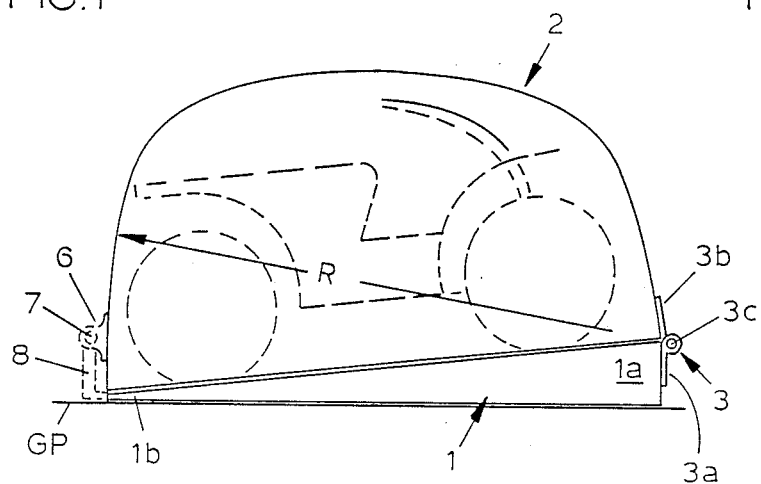
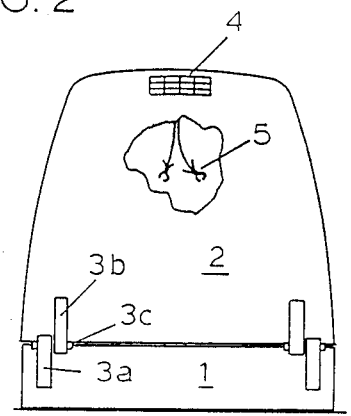
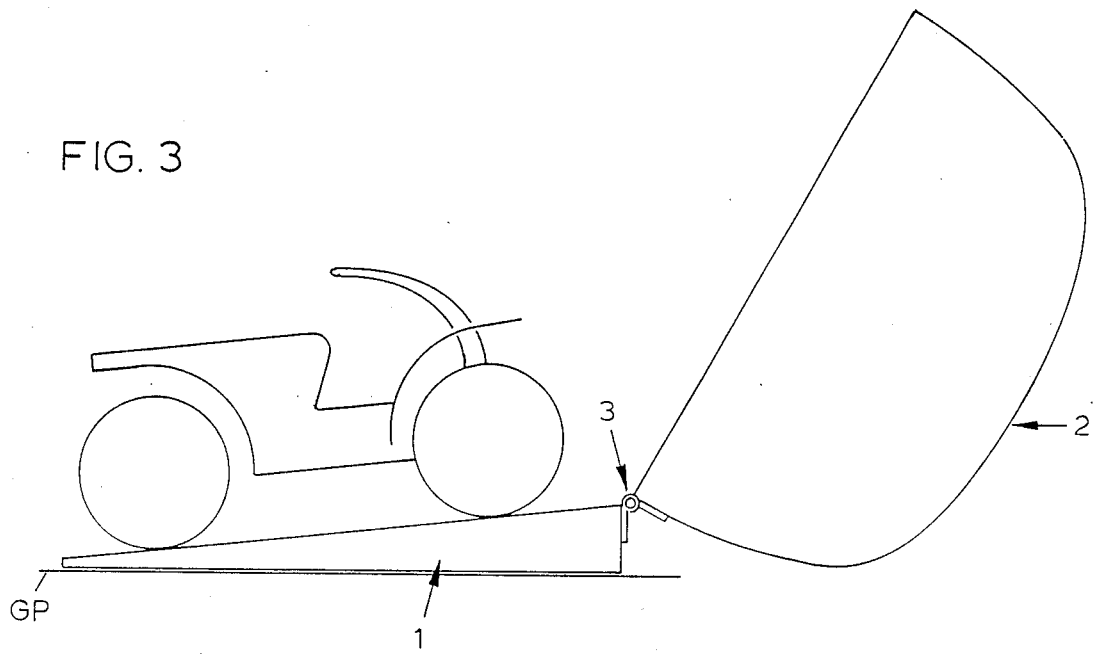
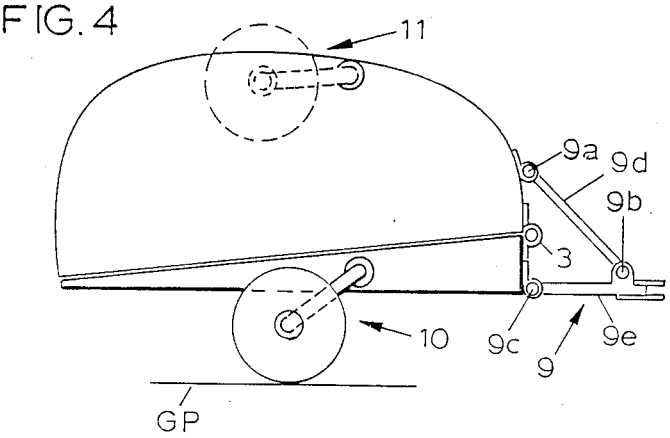
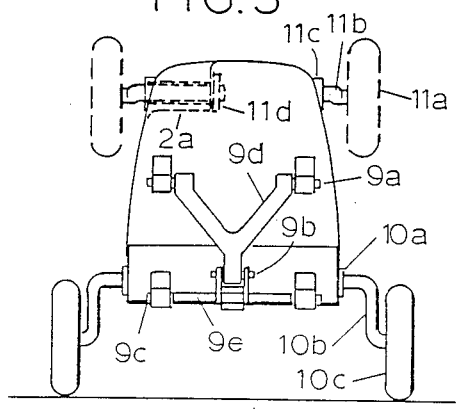

VEHICLE ENCLOSURE

This is a continuation of application Ser. No. 367,985, filed June 19, 1989 and now abandoned.

The present invention relates generally to vehicle enclosures and more particularly to enclosures having a base and an elevated pivot line about which a cover can be pivoted to gain access for the vehicle. Options include features to convert the enclosure into a trailer towable by the vehicle to be protected and a solar panel to charge the vehicle batteries on long storage intervals.

BACKGROUND

Off road vehicles, such as all terrain wheeled vehicles, small tracked vehicles and the like are becoming more useful in agriculture, ranching, forestry and land management. There is a need to be able to move the vehicles to remote locations under their own power and leave them for later use. Such vehicles need protection from the elements and the ability to maintain them in use readiness. The ideal protection will be devised to assist in its own transport and transport ancillary gear at the same time.

There are vehicle enclosures currently available, both soft sided and rigid. Some are of special construction to accomodate forward-only vehicles such as snowmobiles, and some are of special construction not conveniently transported by the vehicle to be protected when fully assembled.

SUMMARY OF THE INVENTION

The present invention overcomes the disadvantages of existing enclosures and addresses the needs defined above. A base is provided having a rectangular plan form and a wedge shaped section with the thick end supporting a hinge for the cover and the thin edge providing the entry ramp for the vehicle. The cover slopes inwardly toward the top, generally fits the rectangular plan of the base. The cover hinges from the elevated edge of the base provided by the thick portion of the wedge shape so that the cover is gravity stabilized when hinged fully open to rest on the plane supporting the base. The cover shape accomodates nesting of covers for shipment and minimizes wind load when closed upon the base. When the cover is unhinged from the base and turned upside down, an optional wheel mounting arrangement allows the then hopper shaped cover to be towed. The base can be used as a lid for the inverted cover. A trailer hitch, attached to the cover, provides means to attach the trailer to the tow vehicle. The enclosure, in its entirety, can be arranged to serve as an open road trailer.

For long duration storage, a solar cell is optionally provided to charge the battery of the protected vehicle. The solar cell is mounted on the roof of the cover and charger leads extend into the enclosure for attachment leading electrically to the battery.

BRIEF DESCRIPTION OF DRAWINGS

In the drawings wherein like features have like captions, FIG. 1 is a side elevation of the basic form of the invention.

FIG. 2 is an end view of the right end of the enclosure of FIG. 1.

FIG. 3 is a side elevation of the enclosure of FIG. 1 with a symbolic vehicle in the usual storage position with the enclosure cover open.

FIG. 4 is a side elevation of an alternate arrangement of the invention, primarily a towing and wheel mounting arrangement added to the basic structure.

FIG. 5 is a view from the right end of the enclosure of FIG. 4.

DETAILED DESCRIPTION OF DRAWINGS

In FIG. 1, base 1 is pivotally attached to cover 2 by hinges 3. A typical vehicle to be enclosed is symbolically shown in the appropriate position on the base and within the cover. Optional hinge means comprising part 6 attached to the cover and part 8 attached to the base and hinge pin 7 secure the back of the cover to the base. This hinge means will normally be used as a latch with pin 7 readily removable. In the event of use to house a forward-only machine such as a snowmobile. The pin 7 would stay in place and hinge pin 3c would be removed to raise the front of the cover so that the vehicle could be driven out forward.

The base 1 has a triangular section and rectangular plan form and resembles a wedge. The thin end 1b serves as the entry ramp. Thick end 1a elevates hinge pin 3c for reasons later described. Hinge member 3a is attached to the base and hinge member 3b is attached to the cover.

For efficiency in use of internal volume, the cover is preferably constructed such that any vehicle part that the lower rim of the cover clears on closing will be accepted by the cover interior without excess internal volume and consequent external profile. The radius R extending from the centerline of hinge pin 3c illustrates the manner of minimizing the enclosure outline.

FIG. 2 shows the enclosure of FIG. 1 with the optional feature of a solar panel added. Solar panel 4 is attached to the cover and leads 5 extend through the cover wall to be attached to the vehicle battery circuitry for maintaining the battery in use readiness during extended storage.

FIG. 3 shows the enclosure of FIG. 1 with the cover 2 opened to rest on the ground plane GP and is stable because of the elevation of hinge 3 such that gravity holds the cover open and stable.

A strut could be used to hold the cover in the opened position but it is desirable to be able to pull the cover down with a line between the vehicle being backed away and the cover. This, of course, in deference to emergency use in such as forestry applications.

FIG. 4 shows the various wheel mounting arrangements, any or all of which may be used on the enclosure. Hitch assembly 9, wheel assembly 10, and wheel assembly 11 can be added to the enclosure of FIG. 1. Wheel assembly 10 has a wide stance and is intended for high speed open road use behind a conventional vehicle. Wheel assembly 11 can be used with the enclosure inverted. The stance is narrow for towing behind the vehicle to be housed through rough terrain. The individual wheel and axle assemblies can be inserted into the wells 10a or 11c. For use when inverted, the wheel assemblies 10 are usuallY used on the cover. This minimizes weight, cost, and lowers the center of gravity.

When the enclosure is inverted, the hitch is rearranged. Element 9e is attached to pin 9a and element 9d is attached to pin 9c and the hitch is again upright. Either the base or the cover can be used as an independent trailer by replacing element 9d with a shorter element and connecting one end to the hinge pin 3c. With the hitch shown in FIG. 4, the trailer will obviously tilt when the cover is opened and lower the rear end for loading.

Joggled axle 10b can be identical to axle 11b for interchangability. Wheels 10c and 11a can be identical.

Axle well 2a is typical of four needed for the assembly shown. This is a molded-in projection with a bore to accept the axle. A flange 11d, fastened to the axle, preferably, by a cap screw (not shown) retains the axle in the bore. The axle bores in the cover are narrower than those in the base. A wider stance is needed if the base is wheeled.

Elements 9d and 9e are shown hingedly connected by pin 9b. This provides an easily stowed and lightweight hitch but it also allows the trailer as shown to tilt down at the back when the cover is raised.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The enclosure having been described, I claim:

1. An improved portable vehicle enclosure comprising a base and a pivotally attached cooperating cover, said cover arranged to cooperate with said base to form a confining plano-concave enclosure, said pivoting cover to move relative to said base to permit entry and exit of a vehicle, the improvement comprising;

said base having a first end and a second end separated by a longitudinal distance, an upper surface and a lower surface separated by an increasing vertical distance from said first end to said second end;

said cover having an inner concave surface bounded by a rim shaped to generally engage the perimeter of said upper surface;

hinge means arranged for attachment to said cover and to said base such that a portion of said rim and said upper surface at said second end are pivotally associated such that said cover can be pivotally rotated about said hinge to admit entry of a vehicle at said first end, wherein said enclosure is adapted to function as a trailer comprising: means to attach at least one axle and wheel assembly to each side of said base providing at least two axle and wheel assemblies; and hitch means attached by a first end to said second end of said base and arranged to a distal end for attachment to a vehicle for towing; and wherein said hitch means comprises an upper member and a lower member hingedly connected near said distal end, said upper member hingedly connected to said cover and said lower member hingedly connected to said base.

2. The enclosure of claim 1 wherein said cover has an upper surface with an attached solar energy converter to convert solar energy to electric energy, conductor means extending from said solar converter to some distance inside said enclosure for attachment to an electrical system of an enclosed vehicle for battery charging.

3. The enclosure of claim 1 wherein said cover is arranged to function as a trailer comprising attachment means on said cover for attachment of at least one wheel with associated axle means on each side of said cover providing at least two wheel and axle assemblies, said wheels attached such that the cover may be inverted to place said wheels in ground contact with said cover clear of the ground.

4. The enclosure of claim 1 wherein means are provided on said cover to accept said wheel and axle assembly, removable from said base, such that said wheels will be in ground contact when said cover is inverted.

5. The enclosure of claim 4 wherein said cover and said base are provided with attachment means such that a hitch can be inverted with an upper member hingedly attached to a base and a lower member bingedly attached to said cover.

6. The enclosure of claim 5 wherein said upper and said lower members are hingedly connected, with each a distance from said hinge means whereby said second end of said base will tilt upward when said cover is raised relative to said base.

7. A combination road trailer, off-road cart, and off-road vehicle enclosure comprising:
(a) a base of generally rectangular horizontal plan form, a front end, a back end, and left and right sides; said sides being generally triangular in form with a base of the triangle toward said front end, and a floor structure joining said sides;
(b) a cover having a concave inner surface terminating in a rim arranged to generally engage said sides and the front and back ends of said floor structure;
(c) hinge means attached to said cover and to said base and situated to allow said cover to pivot about a line near the front end of said end base;
(d) wheel suspension attachment means on each side of said base and on each side of said cover;
(e) at least two wheel and axle assemblies arranged for attachment to said attachment means such that the wheels will extend some distance from said base opposite said cover, when attached to said base and will extend some distance from said cover opposite said base, when attached to said cover;
(f) hitch means attached to said front end of said base and extending a distance forward with means for attachment to a tow vehicle wherein said hitch means are hingedly attached to said cover a distance above said hinge means and hingedly attached to said base a distance below said hinge means.

* * * * *